United States Patent [19]
Garrigues et al.

[11] Patent Number: 5,178,364
[45] Date of Patent: Jan. 12, 1993

[54] SEALING LINER WITH INCORPORATED REACTION RING, MORE PARTICULARLY FOR A CLOSURE MEANS

[75] Inventors: Jean-Claude Garrigues, Cadaujac; Laulhé René, Villenave d'Ornon; Pierre Rieuvernet, Merignac, all of France

[73] Assignee: Applications Mecaniques et Robinetterie Industrielle (A.M.R.I.), Bagnolet Cedex, France

[21] Appl. No.: 463,126

[22] Filed: Jan. 10, 1990

Related U.S. Application Data

[63] Continuation of Ser. No. 196,001, May 19, 1988, abandoned.

[30] Foreign Application Priority Data

May 20, 1987 [FR] France .................. 87 07035

[51] Int. Cl.⁵ .................................. F16K 1/22
[52] U.S. Cl. ........................... 251/306; 251/174
[58] Field of Search ............... 251/173, 174, 305, 306, 251/307

[56] References Cited

U.S. PATENT DOCUMENTS 4,194,749  3/1980  Bonafous .................. 251/306 X
4,247,079  1/1981  Friess ....................... 251/306 X

FOREIGN PATENT DOCUMENTS 0202156 11/1986 France .

Primary Examiner—John C. Fox
Attorney, Agent, or Firm—M. H. Gay

[57] ABSTRACT

A sealing liner is provided with incorporated reaction ring, including two circular substantially concentric sealing elements, namely: a static sealing element and a dynamic sealing element these two elements being connected together by a sealed membrane. The dynamic sealing element has an annular housing containing a resilient deformable bed against which a reaction ring is held applied.

18 Claims, 2 Drawing Sheets

SEALING LINER WITH INCORPORATED REACTION RING, MORE PARTICULARLY FOR A CLOSURE MEANS

This is a continuation of application Ser. No. 196,001, filed May 19, 1988 by Garrigues et al., now abandoned.

BACKGROUND OF THE INVENTION

1. Field of the Invention

The present invention relates to a sealing device providing more particularly for sealing upstream/downstream of a closure means.

It applies more particularly to closure means of the type including a closure member movable inside a tubular body and having, at its periphery, a sealing surface which, at the end of the closure stroke, is applied against a circular sealing liner, after a movement tangential or parallel to the main axis of symmetry of said sealing liner.

The invention also relates to closure means in which, in a reverse assembly, the bore of the body comprises a substantially conical sealing surface and the closure member is provided, at its periphery, with a liner providing static sealing with the closure member and dynamic sealing with said sealing surface.

In these types of closure means the sealing liner must therefore play a multiple role. It must at one and the same time provide static sealing, dynamic sealing and continuity of sealing between static sealing and dynamic sealing.

These sealing functions are particularly delicate to obtain particularly in the case when, because of the operating conditions of the closure means, the sealing liner must at one and the same time be made from a soft material capable of mating with the surface condition of the bearing surface of the seat so as to provide the best sealing, be made from a hard and rigid material capable of withstanding the mechanical forces due to the liner/seat contact pressure and the pressure of the fluid to seal, and yet be sufficiently flexible to make possible relative movements between the closure member and a body without adversely affecting the sealing.

In fact, in this case when, in the closed position of the closure means, the sealing surface of the closure member is not exactly centered on the dynamic sealing surface of the liner, this latter is not uniformly compressed, so that homogeneous sealing cannot be obtained all around the closure means. Thus, in the parts where the liner is highly compressed by the closure member, the closure means may withstand considerable pressures whereas, in the parts diametrically opposite these latter, the sealing is uncertain and the risks of leaks at high pressure are high.

2. Description of the Prior Art

To overcome these drawbacks, attempts have been made to equip the closure means with mechanisms for centering the closure member with respect to the sealing liner, these mechanisms concerning either the kinematics of the closure means or the closure means itself.

However, these solutions are complex, unreliable and result in a considerable increase of the cost price of the closure means.

It has also been proposed to produce the sealing liner in the form of a double flexible metal O-seal comprising:

a first flexible metal O-seal structure providing static sealing with the body of the closure means, a second flexible metal O-seal structure providing the dynamic sealing, a radial membrane made from a resilient material connecting the two sealing structures together while enveloping them at least partially so as to provide the continuity of sealing between static sealing an dynamic sealing, and at the same time allow self centering of the second seal structure on the sealing surface of the closure member, and a floating reaction ring applied against the second seal structure opposite the zone of this structure where the sealing surface of the closure member bears.

Such a sealing liner which is described in the French patent n° 77 22 976 of the Jul. 26, 1977 in the name of the applicant, entitled: "Double flexible O-seal", gives excellent results particularly in the case of valves or cocks intended to operate under conditions (high or low temperatures) for which the use of conventional elastomer liners is prohibited.

Despite these advantages, this liner nevertheless has a number of drawbacks.

First of all, it includes a removable reaction ring not secured to the assembly formed by the two O-seal structures and by the flexible membrane.

It is clear that this feature makes the fitting of the liner in the closure means more delicate with the risk of losing the reaction ring before assembly, for example during handling, storage, delivery or other operations, to which these liners are subjected.

Another drawback resulting from the structure of this liner consists in that it does not provide good initial centering of the reaction ring on the O-seal structure with which it cooperates for providing dynamic sealing of the closure means. Moreover, once the liner has been fitted in the closure means, the reaction ring enjoys a certain axial mobility which makes such centering hazardous. Furthermore, because of the disymmetric shape of the liner, the stresses exerted by the seal structure when it is subjected to the action of the closure means will tend to move this reaction ring axially while increasing decentering thereof.

Consequently, the reaction ring which will be loaded dissymmetrically will not be able to exert an optimum action on the seal structure and, particularly in the case where the closure stroke of the closure means is not parallel to the axis of the liner, the seal structure may in the long run become oval.

It may be finally noted that because of the disymmetry of the stresses which it receives the reaction ring must necessarily be formed from a solid part, to the exclusion of all other materials, possibly composite, which might be envisaged for increasing the flexibility of the sealing surface of the dynamic seal structure.

SUMMARY OF THE INVENTION

The purpose of the invention is to overcome these drawbacks. It provides a sealing liner of the type comprising:

two circular substantially concentric sealing elements, namely: a first element providing static sealing and a second element including on the side opposite the first structure, a circular sealing surface intended to cooperate with a sealing face also circular so as to provide dynamic sealing, a resiliently deformable sealed connection connecting said elements together, and a floating reaction ring, applied against the second sealing element opposite said sealing surface.

In accordance with the invention, this liner is more particularly characterized in that said second sealing element includes an envelope forming an annular housing containing an annular resiliently deformable bed adapted for acting on a circular zone of the housing forming said sealing surface and against which said reaction ring is held applied, and in that this housing is shaped so as to provide permanent centering of said bed and of said ring on said sealing surface.

Thus, the above described liner forms a relatively compact unitary assembly and is therefore easy to use, particularly on assembly.

Because of the centering provided by said centering means, the action of the centering ring, which is loaded symmetrically, is more efficient.

Because it is held in position by the housing. This reaction ring may be made from different materials. It may in particular be made from a spiral shaped metal strip or else by superimposing rings fitted in each other.

Advantageously, said housing may consist of an extension of said suitably shaped membrane or be itself, at least partially, enveloped by said membrane.

Said bed may consist of a toric shaped spring made from a flexible material possibly covered by the primary housing.

According to a second characteristic of the invention, said bed and said reaction ring are made from one and the same annular piece obtained from a spirally wound metal strip.

Advantageously, this strip has a median bend conferring thereon a substantially V shaped profile, so as to obtain an annular piece having, on one side, a convex axial face and on the other a concave axial face. In this case, the zone of the envelope containing the sealing surface has an inner concave profile shape substantially identical to that of said strip, against which the convex axial face of the annular piece is applied.

This arrangement then makes possible, when the liner is subjected to a radial compression force, self centering of the turns of the winding forming the annular piece and of the sealing surface.

Said strip may also have a curved profile so as to obtain an annular piece having, on one side, a concave radial face against which are applied two internal ribs provided on the housing on each side of the sealing surface, this latter then having an outwardly oriented convex shape.

BRIEF DESCRIPTION OF THE DRAWINGS

Several embodiments of the invention will be described hereafter, by way of non limitative examples, with reference to the accompanying drawings in which.

DESCRIPTION OF THE PREFERRED EMBODIMENTS

Figure 1:
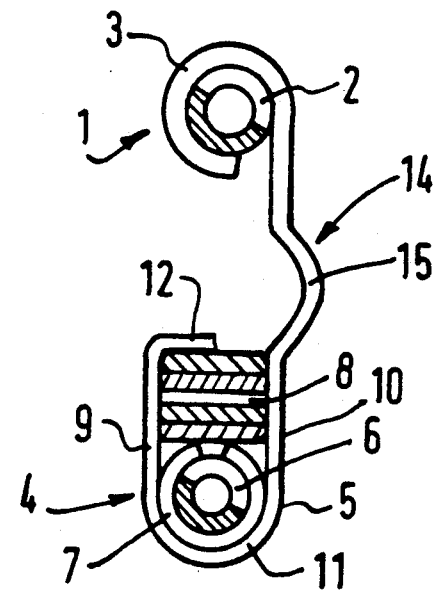
FIG. 1 is an axial half section of a first embodiment of a liner according to the invention.

The sealing liner shown in FIG. 1 includes two substantially concentric seal structures, namely:

a first flexible metal O-seal structure including conventionally a helical spring 2 of toric shape partially covered by a sealing envelope 3 with, possibly, inserted between said spring 2 and said sealing envelope 3 a primary housing, this first seal structure 1 providing static sealing, and a second seal structure 4 including, in a sealing housing 5 having an annular shape with substantially rectangular section, a helical toric shaped spring 6 covered by a primary housing 7 and a reaction ring 8 of rectangular section applied against the primary housing 7.

More precisely, the sealing housing 5 has two parallel radial faces 9, 10 and two axial faces, one of which 11 situated opposite the seal structure, which has a circular section, includes a sealing surface and the other of which 12 is straight.

Thus, the toric assembly formed by spring 6 and the primary envelope 7 mates with the concavity of the axial face 11 of the sealing housing 5 and is therefore held axially in position.

Similarly, the reaction ring 8 is retained axially by the radial faces 9, 10 and radially by the axial face 12.

In this example, the sealing housings 3 and 5 of the seal structures 1 and 4 are formed by one and the same piece, for example made from metal, forming in its middle part a radial resiliently deformable sealing membrane 14 providing continuity of sealing between the two seal structures 1 and 4 and playing the role of resilient element providing flexibility for the self centering of the seal structure 4.

More precisely, this piece has a profile section of revolution substantially in the form of a C, whose two ends form said sealing housings 3, 5 and whose web, which forms membrane 14, has a circular bend 15 conferring thereon resilient radial deformability.

As mentioned above, the reaction ring may be made from different materials. In this example, it consists of a spirally wound metal strip.

By way of example, the above described liner may advantageously provide upstream/downstream sealing for a butterfly valve.

Figure 3:
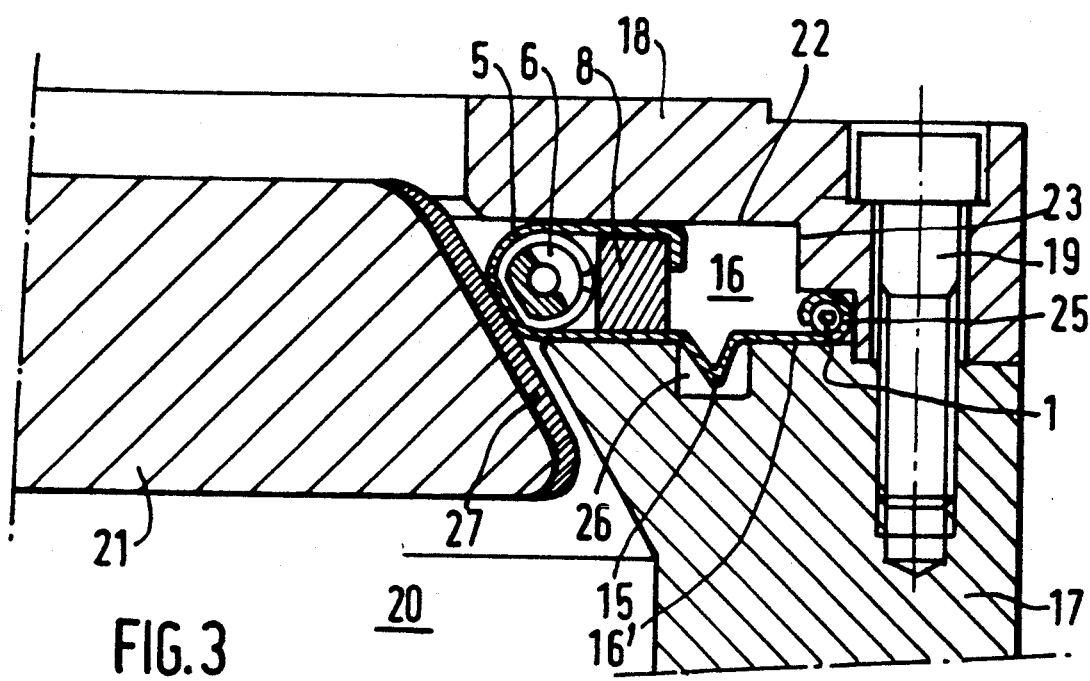
FIG. 3 is a partial section of a butterfly valve in which the lining shown in FIG. 1 is carried by the body of the valve.

For this it may be disposed (as shown in FIG. 3) in a radial annular cavity 16 formed between the lateral side 16' of body 17 of the butterfly valve and a flange 18 fixed on said side 16' by means of clamping screws 19. This cavity 16 opens into the inner chamber 20 of the valve, inside which the closure means 21 may move. This latter may for example be formed by a butterfly pivoting inside body 17 and moving in axial translation at the end of the closure stroke.

The annular cavity 16 has a substantially rectangular cross section whose width is substantially equal to the width of the sealing housing 5 of the seal structure 4 The upper side face 22 and the bottom 23 of this cavity are formed by a stepped bore in flange 18, whereas the lower side face is formed by the lateral side 16' of the body.

In the bottom of cavity 16 an annular groove 25 is provided, formed by a stepped portion of the bore of flange 18 and by the lateral side 16' of the body 17 of the valve.

In this annular groove 25 the O-seal structure 1 is tightly fitted so as to obtain said static sealing.

It should be noted that this seal structure 1 is assembled at the time of fitting flange 18, the sealing pressure being obtained for example by clamping flange 18 against the body 17 of the valve.

On the lower side face of the annular cavity (side 16') is formed a circular recess 26, of substantially rectangular section, in which the bend 15 of the sealing membrane 14 is disposed.

The seal structure 4 for obtaining dynamic sealing has a large diameter slightly less than the internal diameter of body 17 at the level of housing 16 and the mean diameter of the conoid edge 27 of the butterfly 21, so that this seal structure 4 projects slightly inside the internal chamber 20 and so that, in the closed position, the axial face 11 of housing 5 and the bed formed by the toric spring 6 are compressed between the reaction ring 8 and the conoid edge 27 of butterfly 21 It is clear that this structure provides self centering of the seal structure 4 about the edge 27 of butterfly 21, during closure, while guaranteeing an homogeneous sealing pressure at the contact surfaces of these two elements.

Figure 2:
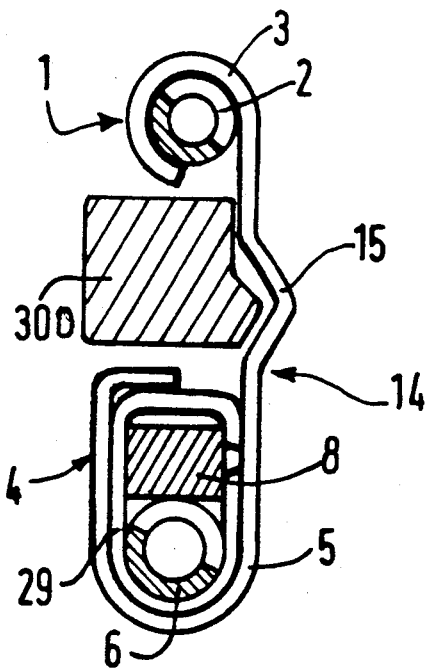
FIG. 2 shows a modification made to this lining.

The sealing liner shown in FIG. 2 has a structure similar to that described above, in that it also includes:

a first flexible metal O-seal structure 1 including a toric shaped helical spring 2 partially covered by a sealing housing 3, this first seal structure also providing static sealing, and a second seal structure 4 providing dynamic sealing and having a sealing housing 5 of annular shape with substantially rectangular section, the sealing housings 3, 5 of these two seal structure 1, 4 being formed by one and the same piece having a section of revolution substantially in the form of a C whose ends form the sealing housings 3, 5 and whose web, which forms membrane 14, has a circular bend 15 conferring thereon resilient radial deformation.

However, in this case, the bed formed by the toric spring 6 and the reaction ring 8 are contained in a primary housing 29 whose external surface is shaped so as to match the inner shape of the sealing housing 5, the assembly formed by this primary housing 29, spring 6 and the reaction ring 8 being housed intimately in this sealing housing 5.

Furthermore, in the annular volume situated between the two seal structures 1, 4, a support ring 300 is also provided which can be used optionally in the case where the liner operates under very high pressure.

The principle of this liner which is substantially the same as that of the liner shown in FIG. 1 will therefore not be described again.

Of course, the invention is not limited to the above described embodiments.

Thus, by way of example, the seal structure 4 providing dynamic sealing could have, inside the sealing housing 5, an annular piece 30 playing both the role of bed and reaction ring.

This double role is obtained by forming the annular piece 30 from a spirally wound metal strip. This strip may then have a median bend conferring thereon a substantially open V profile, so that the annular piece 30 has on one side a convex axial face 31 and on the other a concave axial face 32.

In this case, the axial external face 33 of housing 5 intended to cooperate with the edge 34 of the closure means 35 is shaped so as to have a profile similar to that of the strip, and therefore includes an inner concave shape against which the axial convex face 31 of the annular piece 30 is applied.

In this example, the internal axial face 36 of housing 5 also has a profile similar to that of the strip and therefore has an internal convex shape applied against the concave axial face 32 of the annular piece 30.

Thus, the annular piece 30 is held in position and centered permanently with respect to the contact surface between the axial face 32 and edge 34 of the butterfly 35.

Figure 4:
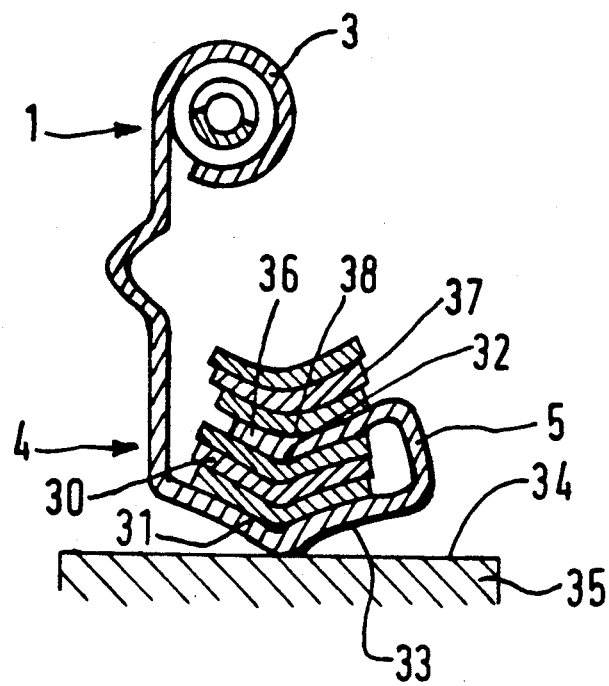
FIG. 4 is an axial half section of a liner of the invention in which said bed and said reaction ring are formed by one and the same piece.

The liner shown in this FIG. 4 further has a spirally wound ring 37 of the same nature as the annular piece 30 whose convex axial face 38 is applied against the concave shape of the inner radial face 36 of housing 5. Thus, the radial face 36 is nipped between the annular piece 30 and the spirally shaped ring 37 and cannot therefore be unbent.

Figure 5:
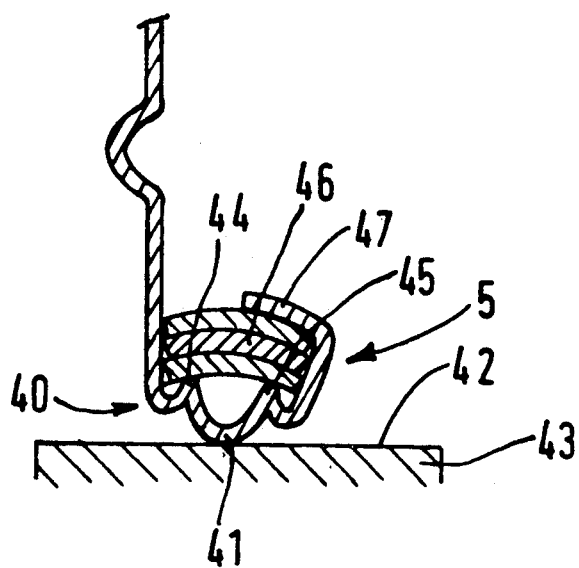
FIG. 5 is an axial half section of the sealing element providing dynamic sealing in another embodiment of a liner according to the invention, in which said bed and said reaction ring are formed by one and the same piece.

In the example shown in FIG. 5, the profile of the external axial face 40 of housing 5 has, in its middle part, an outwardly convex shape 41 for cooperating with the edge 42 of the closure means 43, this convex shape 41 being edged by two lateral bends forming, inwardly of the housing, two ribs 44, 45.

The annular piece 46 housed in housing 5 is then made from a strip with curved profile and so has:

a concave axial face against which the two ribs 44, 45 come to bear; and a convex face on which the internal axial face 47 of housing 5 is applied.

In this case, the annular piece 46 is centered by the radial faces of housing 5.

It should be noted that the invention is not limited to a particular type of seal structure 1 for providing the static sealing, this structure possibly comprising a heel or even a radial flat circular edge.

The liners of the invention may further be made entirely from metal. However, they could also be made partially or even wholly from other possibly composite materials.

What is claimed is:

1. A valve comprising:
    body means having inner chamber means providing for flow through the body;
    closure means supported in said body means and controlling flow in said chamber means;
    flange means secured to said body means;
    radial annular cavity means formed in said body means and flange means and opening into said chamber means; and
    sealing liner means in said cavity having first and second circular and substantially concentric sealing means connected together by resiliently deformable means, with said first sealing means providing a static seal in said cavity and said second sealing means providing a dynamic seal with said closure means;
    said second sealing means comprising:
    annular resiliently deformable spring means,
    floating reaction ring means spaced from said first sealing means, and
    sealing housing means having two opposite radial walls confining said spring means and said ring means and preventing movement therebetween along their axes,
    said housing means having a portion interconnecting said radial walls and providing a circular sealing surface for engaging a sealing surface on said closure means,
    said housing portion and said spring means compressed between said closure means and said ring means when said closure means is in the closed position.

2. The valve of claim 1 wherein said housing means has an annular wall extending from one of said radial wall and engaging said reaction ring means on its side remote from said spring means.

3. The valve of claim 2 wherein said spring means and said ring means are substantially enclosed in primary housing means and said sealing housing means overlies said primary housing means.

4. The valve of claim 1 wherein said housing means and said ring means are substantially enclosed in primary housing means and said sealing housing means overlies said primary housing.

5. The valve of claim 1 wherein said housing means a helical toric shaped spring.

6. The valve of claim 1 wherein said housing means a helical toric shaped spring at least partially covered by a primary housing.

7. The valve of claim 1 wherein said reaction ring means is made from a spirally wound metal strip.

8. The valve of claim 1 wherein a support ring is mounted between the first and second sealing means.

9. The valve of claim 1 wherein said housing means and said resiliently deformable means are formed from the same member.

10. A valve comprising:
body means having inner chamber means providing for flow through the body;
closure means supported in said body means and controlling flow in said chamber means;
flange means secured to said body means;
radial annular cavity means formed in said body means and flange means and opening into said chamber means; and
sealing liner means in said cavity having first and second circular and substantially concentric sealing means connected together by resiliently deformable means, with said first sealing means providing a static seal in said cavity and said second sealing means providing a dynamic seal with said closure means;
said second sealing means comprising:
floating reaction ring means,
sealing housing means having two walls confining said ring means and preventing its movement along its axis,
said housing means having a portion interconnecting said walls and providing a circular sealing surface for engaging a sealing surface on said closure means, and
resilient means compressed between said interconnecting portion and said ring means when said closure means is in its closed position.

11. The valve of claim 10 wherein said reaction ring is formed from a spirally wound metal strip which provides a bed and a reaction ring supporting said portion interconnecting said walls.

12. The valve of claim 11 wherein said strip has a median bend conferring thereon a substantially V shaped profile, and the interconnecting portion of said housing means has an inner concave shape with a profile substantially identical to that of said strip.

13. The valve of claim 12 wherein said housing means has an inner axial portion shaped to mate with the shape of the concave axial face of the strip.

14. The valve of claim 13 wherein a spirally wound ring having a V shaped median bend engages the inner axial portion on the side remote from said circular sealing surface.

15. The valve of claim 10 wherein said reaction ring means has a curved profile providing on one side a concave radial face, and
said housing on either side of the portion of said housing providing said circular sealing surface has to lateral internal ribs engaging said reaction ring means.

16. As a subcombination a sealing liner comprising:
first and second circular and substantially concentrate sealing means connected together by resiliently deformable means, with said first sealing means providing a static seal and said second sealing means providing a dynamic seal;
said second sealing means comprising:
floating reaction ring means, and sealing housing means provided by said resiliently deformable means and having two walls contacting said ring means and preventing its movement along its axis relative to said sealing housing means,
said housing means having a portion interconnecting said walls and providing a circular sealing surface, and
resilient means,
said interconnecting portion and said resilient means compressed between said closure means and said ring means when said closure means is in its closed position.

17. As a subcombination a sealing liner comprising:
first and second circular and substantially concentrate sealing means connected together by resiliently deformable means, with said first sealing means providing a static seal and said second sealing means providing a dynamic seal;
said second sealing means comprising:
annular resiliently deformable spring means;
floating reaction ring means, and
sealing housing means provided by said resiliently deformable means and having two opposite radial walls confining said spring means and said ring means and preventing relative movement therebetween along their axes,
said housing means having a portion interconnecting said radial walls and providing a circular sealing surface,
said interconnecting portion and said resilient means compressed between said closure means and said ring means when said closure means is in its closed position.

18. A valve comprising:
body means having inner chamber means providing for flow through the body;
closure means supported in said body means and controlling flow in said chamber means;
flange means secured to said body means;
radial annular cavity means formed in said body means and flange means and opening into said chamber means; and
a sealing liner comprising:
first and second circular and substantially concentric sealing means connected together by resiliently deformable means, with said first sealing means providing a static seal and second sealing means providing a dynamic seal;
said second sealing means comprising:
floating reaction ring means, sealing housing means having two walls contacting said ring means and preventing its movement along its axis relative to said housing means, said housing means having a portion interconnecting said walls and providing a circular sealing surface. and resilient means, said housing portion and said resilient means compressed between said closure means and said ring means when said closure means is in the closed position.

* * * * *